United States Patent
Turunen

(10) Patent No.: US 9,848,475 B2
(45) Date of Patent: Dec. 19, 2017

(54) LED LIGHT SOURCE AND METHOD FOR ADJUSTING COLOUR TONE OR COLOUR TEMPERATURE OF LED LIGHT SOURCE

(71) Applicant: Teknoware Oy, Lahti (FI)

(72) Inventor: Olli Turunen, Lahti (FI)

(73) Assignee: TEKNOWARE OY, Lahti (FI)

( * ) Notice: Subject to any disclaimer, the term of this patent is extended or adjusted under 35 U.S.C. 154(b) by 0 days.

(21) Appl. No.: 15/440,780

(22) Filed: Feb. 23, 2017

(65) Prior Publication Data

US 2017/0245338 A1 Aug. 24, 2017

(30) Foreign Application Priority Data

Feb. 24, 2016 (FI) .................................... 20165143

(51) Int. Cl.
*H05B 37/00* (2006.01)
*H05B 39/04* (2006.01)
(Continued)

(52) U.S. Cl.
CPC ..... *H05B 33/0857* (2013.01); *H05B 33/0815* (2013.01); *H05B 33/0827* (2013.01); *H05B 33/0845* (2013.01); *H05B 37/0281* (2013.01)

(58) Field of Classification Search
CPC ..... H01T 2/00; H01T 1/00; H01T 2/02; H01J 17/00; H01J 2893/0059; G09G 3/22;
(Continued)

(56) References Cited

U.S. PATENT DOCUMENTS

2005/0116922 A1 6/2005 Kim
2007/0222743 A1 9/2007 Hirakata
(Continued)

FOREIGN PATENT DOCUMENTS

EP 1 487 243 A1 12/2004
GB 2 515 805 A 1/2015
WO WO 2015/074881 A1 5/2015

OTHER PUBLICATIONS

European Search Report for EP 17 15 7136, dated Jul. 5, 2017; pp. 1-2.

*Primary Examiner* — Minh D A
(74) *Attorney, Agent, or Firm* — Birch, Stewart, Kolasch & Birch, LLP

(57) ABSTRACT

In a light source, a plurality of parallel LED strings or columns (R, G, B) share the same current source (12) as a function of time. Current distribution to the LED strings is carried out with semiconductor switches (Q1, Q2, Q3) that are connected in series with the LED strings. Each semiconductor switch and the corresponding LED string is controlled with a dedicated pulse-width modulated colour control signal (C1, C2, C3). The pulse-width modulated control signals control the semiconductor switches (Q1, Q2, Q3) and the LED strings (R, G, B) sequentially active one at a time and to take current from the common current source (12) for the time defined by the corresponding pulse-width modulated control signal (C1, C2, C3). This control establishes colour tone and colour temperature adjustment, which is independent of the operation of the shared current source. The adjustment of the colour tone or colour temperature of a light source may be controlled by two pulse-width modulated colour signals (A, B) from which, in the LED light source, the required number of pulse-width modulated colour control signals (C1, C2, C3) are formed by logical operations, such as NOR, XOR, and AND operations.

15 Claims, 5 Drawing Sheets

(51) Int. Cl.
*H05B 33/08* (2006.01)
*H05B 37/02* (2006.01)

(58) Field of Classification Search
CPC ........ G09G 2320/0233; H05B 37/0272; H05B 41/00; H05B 41/36; H05B 33/0815; H05B 33/0818; H05B 41/2828; H05B 41/3921; H05B 41/3927; H05B 33/0803; H05B 33/0827; H05B 33/0809; H05B 33/0821; H05B 37/029; H05B 37/0254; H05B 33/083; F21Y 2101/02; B23K 9/0732
See application file for complete search history.

(56) References Cited

U.S. PATENT DOCUMENTS

| | | | |
|---|---|---|---|
| 2008/0116818 A1 | 5/2008 | Shteynberg et al. | |
| 2009/0251071 A1 | 10/2009 | Gater et al. | |
| 2010/0148703 A1 | 6/2010 | Mizuno | |
| 2011/0115407 A1* | 5/2011 | Wibben | H05B 33/0815 315/294 |
| 2013/0293379 A1* | 11/2013 | Rains, Jr. | G08B 15/00 340/541 |
| 2014/0361696 A1* | 12/2014 | Siessegger | H05B 33/0803 315/186 |
| 2015/0115816 A1* | 4/2015 | Bradford | H05B 33/083 315/192 |

* cited by examiner

LED LIGHT SOURCE AND METHOD FOR ADJUSTING COLOUR TONE OR COLOUR TEMPERATURE OF LED LIGHT SOURCE

BACKGROUND OF THE INVENTION

The invention relates to LED light sources and in particular to adjusting the colour tone and colour temperature of LED light sources.

LED (Light Emitting Diode) lighting has become common in most diverse uses. The benefits of LED light sources include their energy efficiency and long service life, in particular. LED light sources may also be used inside cars as main and night-time lights. LED light sources are additionally well-suited for implementing security lighting of buildings, ships and other similar objects.

RGB (Red-Green-Blue) refers to the three primary colours of light, red, green and blue, out of which the other colours and white may be formed. A conventional single LED may only send single-colour (monochromatic) light, which may be one of these three primary colours. To create more colours, three LEDs may be used together for an RGB mix. An RGB LED is in principle three single-colour LEDs placed close to one another, often in the same package, and which are red, green and blue in colour. When all the LEDs of an RGB-LED emit at proportionately the same luminous intensity, and the right kind optics is used, the light emitted from an RGB-LED appears white to the human eye. The colour temperature of an RGB-LED may easily be changed by adjusting the emissive power of the differently coloured LEDs in the light source.

The adjusting methods most usually aim to affect the value of the forward current. A common method for adjusting the light intensity of an LED light source is to used pulse width modulation (PWM), that is, modulate the electric power fed to the light source. When the controlling takes place by pulse width modulation, the maximum value of the current fed to the LED is constant, but the average of the current is controlled by adjusting the length (on-time) of the current pulse in relation to the cycle time. Typically, a switching frequency higher than at least 200 Hz is used, so that the human eye cannot detect the flickering of the light. In the case of an RGB light source, the luminous intensity of each single colour LED or LED string is adjusted separately and each has its own constant-current regulator. The colour change and dimming of an RGB-LED light source therefore requires three PWM signals, each modulating the electric power feed to one LED string. Such a solution involves several drawbacks and problems. The power input of a light source is highly pulse-like and the current input varies in the range 0-300% of the nominal current of the light source. A change in the pulse ratio of each individual PWM signal affects both the colour tonecolour tone and the dimming. A full resolution for colour tonecolour tone only exists at 100% power (the combined pulse width of the PWM signals is 100%). When an LED is dimmed, the resolution of colour tones becomes worse and the colour tone changes at every step. The colour tones and intensities of adjacent LED strings vary according to the tolerances of the constant current regulators. The warming up of LED light fixtures makes the phenomenon worse.

Another known solution is the constant current reduction (CCR), in which the magnitude of an LEDs forward current is linearly adjusted. In the solution, each colour component in the LED string of each LED light source has its own adjustable current regulator, used to carry out the colour change and dimming of the light source by separately adjusting the current of the LED string of each colour component. This solution, too, involves several drawbacks and problems. The full resolution for a colour tone only exists at 100% of power. When an LED light source is dimmed, the resolution of colour tones becomes worse and the colour tone changes at every step. The resolution of a colour is weak even with the 100% power, because an LED have a specific minimum current below which the operation of the LE The intensity of an LED as a function of current is not linear, which makes it difficult to calculate the colour tone, and the colour tone changes with dimming partly due to this phenomenon. The microcontroller that controls a light source needs to check that the current of any colour component in the LED light source is not under the LEDs minimum current. If the current is about to go below the minimum, the colour component in question must be switched off or its current raised to the minimum level. The minimum intensity of white light is in an LED light source limited to three times the LED minimum current, because the LED of each colour must have at least a minimum current. The colour tones and intensities of adjacent LED strings vary according to the tolerances of their constant current regulators. The uneven warming up of an LED light source makes this phenomenon worse.

BRIEF DESCRIPTION OF THE INVENTION

The object of the invention is an LED light source having a colour tone or colour temperature adjustment wherein the prior art problems and drawbacks are mitigated or at least partly avoided. The object of the invention can be achieved with the LED light source and adjustment method according to the attached independent claims. Preferred embodiments of the invention are disclosed in the dependent claims.

An aspect of the invention is an LED light source comprising at least three series connections of a LED string and semiconductor switching device, which series connections are in parallel configuration and adapted to share a common current source as a function of time, and the LED light source further comprising a colour tone or colour temperature controller which is adapted to provide at least three pulse-width modulated control signals to control said at least three series connections of a semiconductor switch and a LED string sequentially active one at a time and to take current from said common current source for a time defined by the respective one of said pulse-width modulated control signals, said colour tone or colour temperature controller being adapted to form said at least three pulse-width modulated colour control signals from two pulse-width modulated colour control signals.

In an embodiment the current of said common current source is adjustable for adjusting the light intensity.

In an embodiment said at least three LED strings are adapted to emit respectively at least two different colours.

In an embodiment said at least three LED strings comprise LED strings emitting substantially two, three, or four different colours.

In an embodiment said light source is an RGB-LED light source, and wherein said at least three LED strings comprise a first LED string emitting substantially red light, a second LED string emitting substantially green light, and a third LED string emitting substantially blue light.

In an embodiment said light source is an RGBW-LED light source, and said at least three LED strings comprise a first LED string emitting substantially red light, a second LED string emitting substantially green light, and a third LED string emitting substantially blue light, and a fourth LED string emitting substantially white light.

In an embodiment said at least three LED strings comprise a first LED string and a second LED string emitting substantially white light and at least one LED string emitting non-white light.

In an embodiment the LED light source comprises a first LED group having said at least three series connections of a LED string and a semiconductor switch device in parallel configuration, and at least one parallel LED group which has corresponding at least three series connections of a LED string and a semiconductor switch device parallel configuration, said at least one parallel LED group each having its own common time-shared current source, and wherein said at least three pulse-width modulated control signals of the colour tone or colour temperature controller are adapted to control all the LED groups simultaneously in parallel whereby the corresponding series connection of a LED string and a semiconductor switch device in all the LED groups is simultaneously controlled to be active and to take current from said common current source for the time defined by the corresponding pulse-width modulated control signal.

An aspect of the invention is a method for adjusting the colour tone or colour temperature of an LED light source according to any embodiment of the invention, the method comprising
  controlling the colour tone or colour temperature of the LED light source by said two pulse-width modulated colour control signals, and
  forming, in the LED light source, said at least three pulse-width modulated colour control signals from said two pulse-width modulated colour control signals.

In an embodiment the states of said two pulse-width modulated colour control signals sequentially form at least three state combinations each of which represents one of said at least three pulse-width modulated colour control signals.

In an embodiment the rising edges of said two pulse-width modulated colour control signals are substantially simultaneous, and wherein said at least three pulse-width modulated colour control signals are formed from said two pulse-width modulated colour control signals by logical operations, preferably logical NOR, XOR, and AND operations.

In an embodiment the rising edges of said two pulse-width modulated colour control signals are substantially coincident, and wherein four pulse-width modulated colour control signals are formed from said two control signals by logical operations, two of said four pulse-width modulated colour control signals being available in each control cycle and the other two of said four pulse-width modulated colour control signals being selectively selectable.

In an embodiment the rising edges of said two pulse-width modulated colour control signals have a phase difference, and four pulse-width modulated colour control signals are formed wherein from said two control signals by logical operations.

An aspect of the invention is a light fixture comprising an LED light source according to an embodiment of the invention.

An aspect of the invention is a lighting system comprising LED light sources according to an embodiment of the invention and control means to adjust their colour tone or colour temperature by a method according to an embodiment of the invention.

BRIEF DESCRIPTION OF THE FIGURES

The invention will now be described in more detail in connection with preferred embodiments and with reference to the accompanying drawings, in which.

DESCRIPTION OF EXEMPLARY
EMBODIMENTS OF THE INVENTION

According to an aspect of the invention, a plurality of parallel LED strings or columns share the same current source as a function of time. Current distribution to the LED strings is carried out with semiconductor switches that are connected in series with the LED strings. Each semiconductor switch and the corresponding LED strings is controlled with a dedicated pulse-width modulated colour control signal. The pulse-width modulated control signals control the semiconductor switches and the LED strings sequentially to go active one at a time and to take current from the common current source for the time defined by the corresponding pulse-width modulated control signal. This control establishes colour tone and colour temperature adjustment, which is independent of the operation of the shared current source. The shared current source only affects the light intensity whereas the colour tone and colour temperature adjustment has the full resolution at all the forward current values. For example, the use of a dimmable shared current source does not affect the adjustment of colour tone or colour temperature according to the invention, but dimming is a separate feature. The adjustment of the colour tone or colour temperature of a lighting fixture may advantageously be controlled by two pulse-width modulated colour control signals from which, in the light source, the required number of pulse-width modulated colour control signals are formed for the LED strings by logical operations, such as NOR, XOR, and AND operations.

LED strings may be adapted to emit light with at least two different colours. In an exemplary embodiment, the LED strings comprise LED strings emitting substantially two, three, or four different colours. Although the following exemplary embodiments are described as implemented with certain LEDs, such as RGB LEDs, instead of them or in addition to them any LED types and colours may be used, such as Cyan, Yellow, and Magenta LEDs in any combination.

Figure 1:
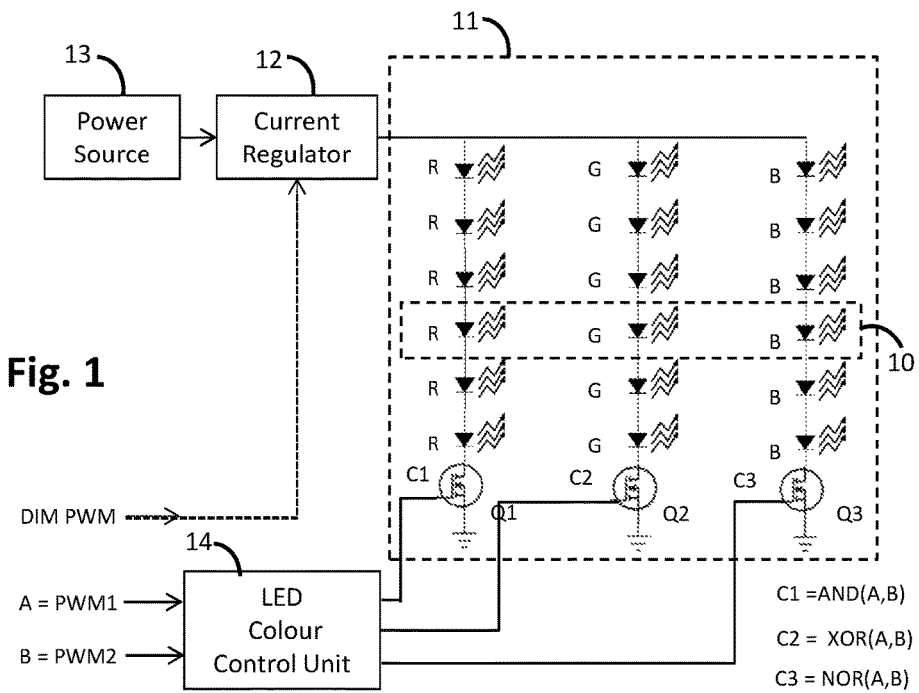
FIG. 1 shows a principled block and connection diagram of an RGB-LED light source according to an exemplary embodiment.
Figure 4:
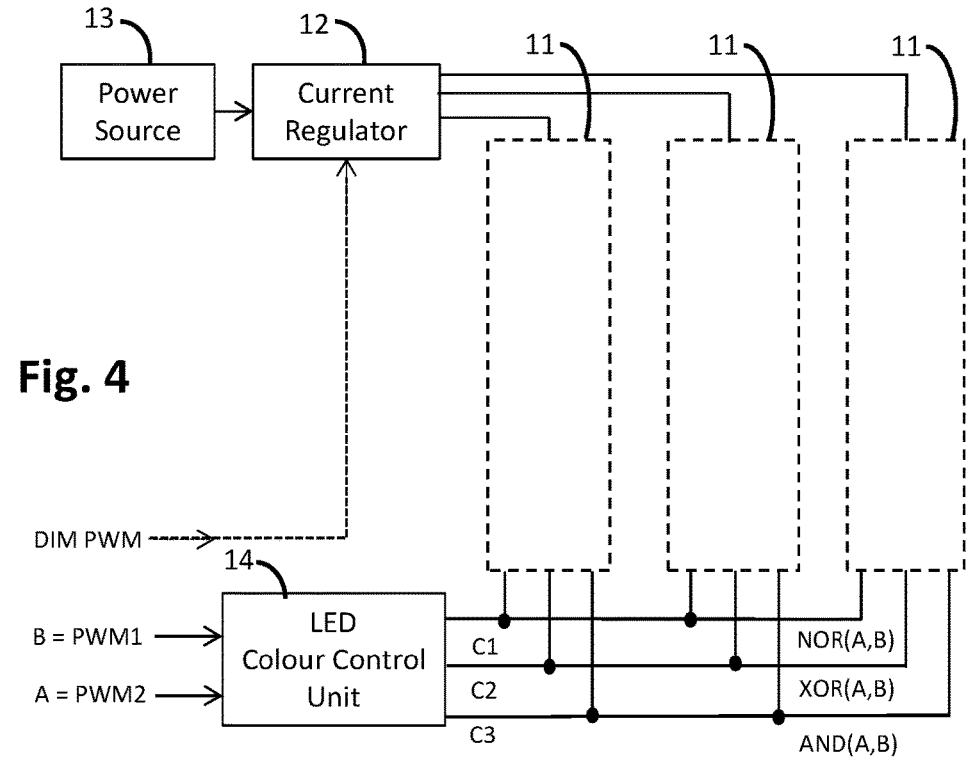
FIG. 4 shows a principled block and connection diagram of an RGB-LED light source having a plurality of LED groups, according to an exemplary embodiment.

In some exemplary embodiments of the invention, the light source is an RGB-LED light source. FIG. 1 shows an example of an RGB-LED light source in principle. In this example, the light source comprises three LED strings connected in parallel: a first LED string (R) emitting substantially red light, a second LED string (G) emitting substantially green light, and a third LED string (B) emitting substantially blue light. A conventional single LED may only send single-colour (monochromatic) light, which may be one of these three primary colours. To create more colours, three parallel LEDs may be used together for an RGB mix. In the example of FIG. 1, the LEDs R, G, and B of different colours are shown as separate components placed adjacent to each other, but they may be combined in one package to form an RGB-LED, which is illustrated by the dotted line 10 in FIG. 1. Parallel LED strings, such as R, G, and B as well as semiconductor switches connected in series with them may form a group 11. An LED light source may have a plurality of parallel LED groups 11, which form a larger entity, as illustrated in FIG. 4. The exemplary embodiment of FIG. 4 is advantageously similar to FIG. 1, but it has three parallel LED groups 11 controlled by the same pulse-width modulated control signals C1, C2, and C3. A plurality of LED groups 11 may share a common current source 12, but advantageously each LED group 11 may have its own current regulator 12, as illustrated in FIG. 4 by separated feed lines. Even in such a case, the solution saves three current regulators per LED group compared with known solutions. The current regulators 12 may use a shared DIM PWM signal, as illustrated in FIG. 4.

In the example of FIG. 1, each LED string has six LEDs connected in series in the forward direction, but the number of LEDs is not restricted to this but a LED string may have any number of LEDs. Generally, an LED string or column in this document refers to a series connection in the forward direction of two or more LEDs, in which the cathode of a subsequent LED is connected to the anode of a previous LED. On the current path of each LED string R, G, and B a semiconductor switch Q1, Q2, and correspondingly Q3 has been connected in series to close and open the current path as controlled. In the example of FIG. 1, each semiconductor switch Q1, Q2, and Q3 is connected to the lower end (the lower voltage end) of the respective LED string R, G and B, that is, the cathode end, but the semiconductor switch Q1, Q2, and Q3 may be connected to the upper end (the higher voltage end) of the respective LED string R, G, and B, that is, the anode end, or at another place in the LED strings. In the example of FIG. 1, the lower end voltage is shown as the zero potential (ground), but it may be any lower or more negative voltage in relation to the upper end, so the LED strings are forward biased. In the example of FIG. 1, each switch Q1, Q2, Q3 is illustrated by one semiconductor switch but the switch may be a switching circuit that comprises a plurality of additional components, such as resistors, transistors, operational amplifiers etc. In the example of FIG. 1, the semiconductor switches Q1, Q2, and Q3 are shows as field effect transistors (FET) but they may be implemented with any semiconductor switches that are suitable for breaking the current path of a LED string, such as a bipolar transistor, semiconductor relay etc.

Figure 2:
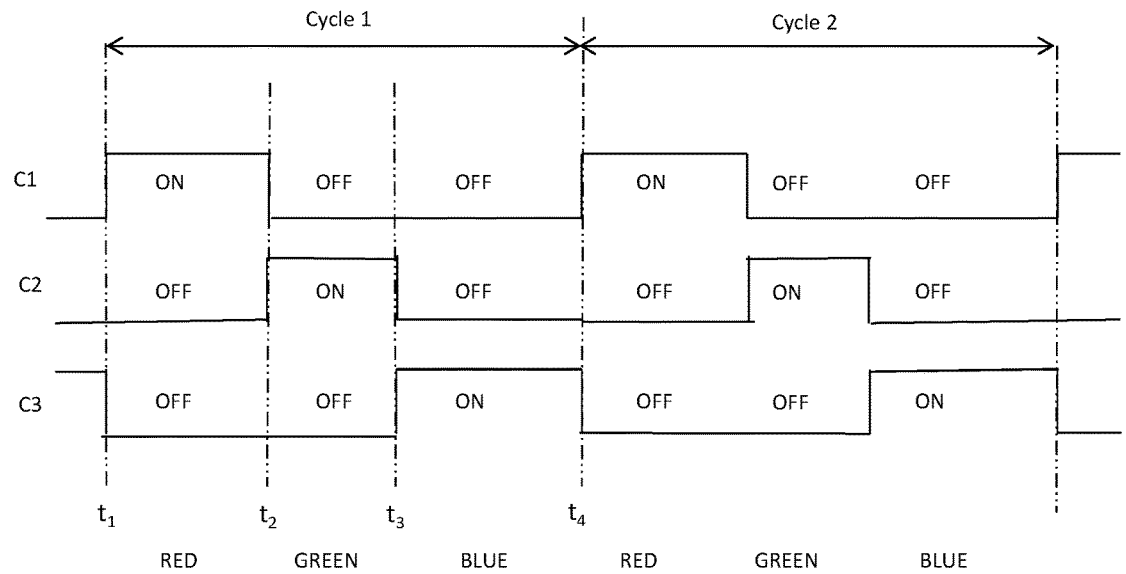
FIG. 2 is a signal flow diagram showing an example of the control signals of the light source of FIG. 1 during two control periods.

The LED strings R, G, and B are connected to a common current source or current regulator 12, which they share as a function of time. This means that the LED strings R, G, and B are controlled successively, one LED strings at a time, to take current from the shared current source 12. In the example of FIG. 1, the switch Q1 of the LED string R is controlled by a pulse-width modulated colour control signal C1, the switch Q2 of the LED string G is controlled by a pulse-width modulated colour control signal C2, and the switch Q3 of the LED strings B is controlled by a pulse-width modulated colour control signal C3. FIG. 2 shows an example of the control signals C1, C2, and C3 during two control periods, Period 1 and Period 2. Although the control sequence order in the example is R, G, and B, the LED strings may be controlled in any order. At the beginning of the period, at the time instant t1, the control signal C1 goes from the OFF state into the ON state starting a control pulse, the control signal C2 remains at the OFF state, and the control signal C3 goes from the ON state to the OFF state. Current passes through the LED string R and the LED strings R emits light for the time period t1-t2 determined by the width of the control pulse. There is no current going through the LED strings G and B, so they are off. At the time instant t2, the control signal C1 goes to the OFF state, the control signal C2 goes into the ON state starting a control pulse, and the control signal C3 remains in the OFF state. Current now passes through the LED string G and the LED string G emits light for the time period t2-t3 determined by the width of the control pulse. There is no current going through the LED strings R and B, so they are off. At the time instant t3, the control signal C1 remains in the OFF state, the control signal C2 goes into the OFF state, and the control signal C3 goes into the ON state starting a control pulse. Current passes through the LED string B and the LED string B emits light for the time period t3-t4 determined by the width of the control pulse. There is no current going through the LED strings R and G, so they are off. The same sequence is then repeated in the subsequent period. By adjusting the ratio of the pulse widths of the LED strings, that is, their proportion of the entire control period, the desired colour tone or colour temperature of the light source may be adjusted. For example, if the share of red light is increased, the proportion of the blue or green light, or both, of the entire control period is reduced. In the example of FIG. 4, which has a plurality of groups, the control signals C1, C2, and C3 simultaneously control each group 11. For example, the control pulse of the control signal C1 simultaneously turns on the LED string R in each group 11.

Due to time sharing, only one current source 12 is needed in one LED group, from which in practice the same current is taken to all the LED strings. The tolerances of the shared current source 12 only affect the light intensity of the LED strings and the effect is the same on all the LED strings in the LED group. The tolerances of the shared current source 12 do not have an effect on the colour tones of the LED light source. When an LED light source has a plurality of parallel LED groups 11, each having its own current regulator 12 as in the example of FIG. 4, the tolerances of the power sources 12 in the different LED groups 11 show as an intensity difference between the different LED groups 11, but still do not cause colour tone differences. The shared current source 12 and the entire light source get their electric power from a suitable power source 13, which is a 24 volt direct current power source, for example.

In some embodiments, the shared current source 12 may be provided with a dimming feature, which adjusts the forward current going to the LEDs and this way the light intensity of the LED light source. Because all the LED strings R, G, and B alternately take their current from the same shared current source 12, the current is the same in all the parallel LED strings R, G, and B regardless of the dimming. The minimum intensity of white light may be set at the minimum current specified for the LED instead of at three times the minimum current in the conventional solutions. Full resolution is achieved for the colour tones of the light source at all the dimming levels over the minimum current specified for the LED. In the example of FIG. 1, the dimming of the light source is carried out by pulse-width modulation control. The current source 12 may be controlled, for example, by a pulse-width modulated dimming control signal, such as DIM PWM in FIG. 1. In the current regulator, a DC voltage reference is formed of the PWM signal.

The control signals C1, C2, and C3 may be generated by a suitable control circuit, control logic, or microcontroller, for example. In the example of FIG. 1, the control unit for the colour tone or colour temperature is generally depicted with the control unit 14. The pulse-width modulated control signals C1, C2, and C3 may also be received from another controller as analogue signals or as digital control through a specific control bus, such as DALI.

The inventive control of the time division of the current source makes it possible to transfer the information needed to form three or more pulse-width modulated control signals C1, C2, and C3 in two pulse-width modulated colour colour signals, such as the signals A and B (PWM1 and PWM2) in the example of FIG. 1. In some embodiments, the states (e.g. ON and OFF) of the pulse-width modulated colour signals A and B sequentially form at least three state combinations, each of which representing one pulse-width modulated control signal C1, C2, C3 etc. In some embodiments, the pulse-width modulated control signals C1, C2, C3 etc may be formed from the colour signals A and B with simple logic operations. These logic operations may be implemented in the control unit 14 by software or logic circuits. The reduction of the required colour control signals from three or more to two reduces cabling needs in a building or vehicle where the light source is centrally controlled. The reduction in the number of signals may also lower the costs of the control system due to the microcontroller or similar requiring fewer signal outputs.

Figure 3:
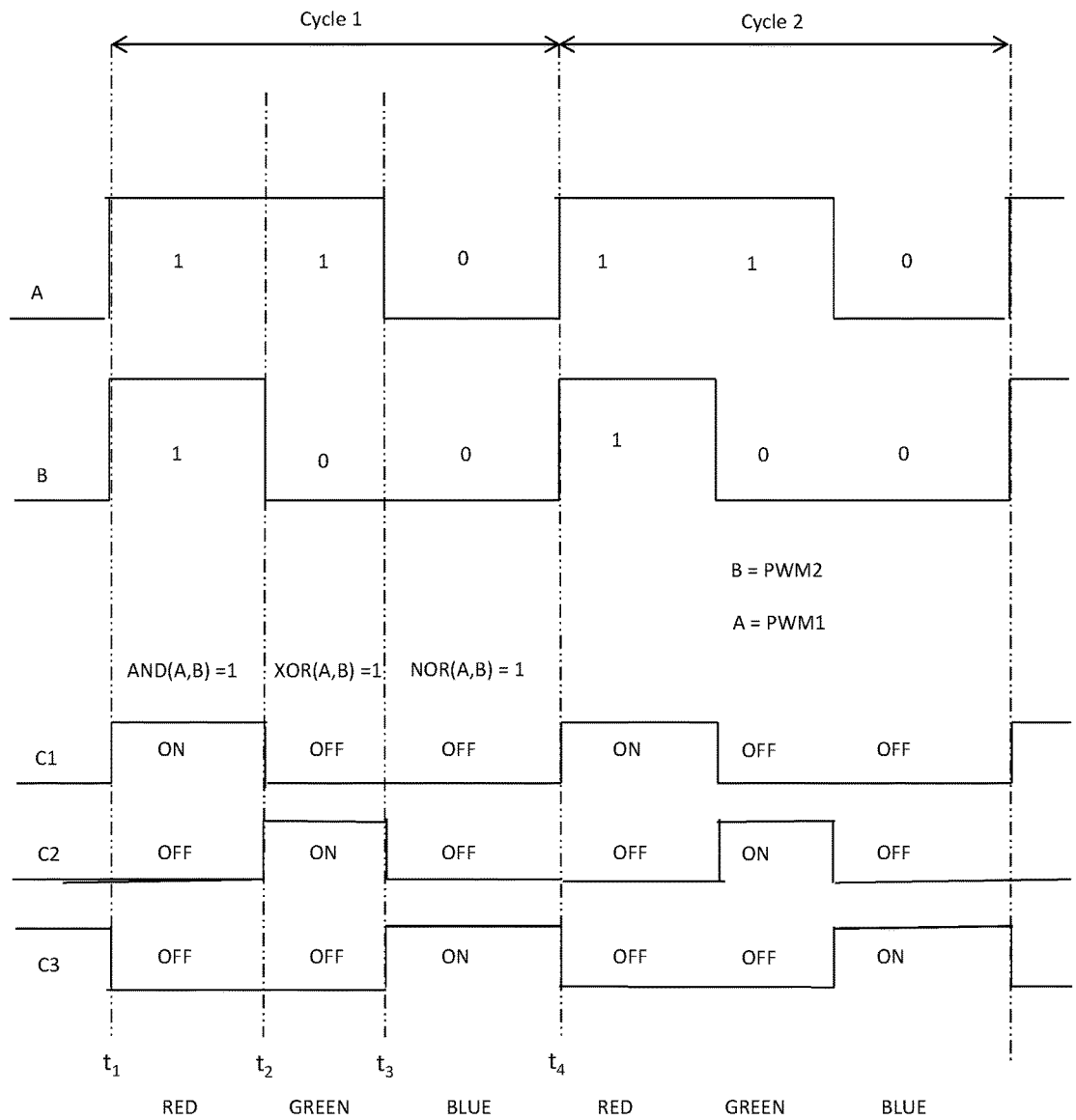
FIG. 3 is a signal flow diagram showing an example of forming the control signals of the light source in FIG. 1 from two pulse-width modulated colour signals.

The signal flow diagram of FIG. 3 shows an example of pulse-width modulated colour signals A and B (PWM1 and PWM2) and of the forming of control signals C1, C2, and C3 by logical operations. The timing of the control signals C1, C2, and C3 is the same as in the example of FIG. 2. In the example of FIG. 3, the rising edges of the pulses of the colour signals A and B are substantially simultaneous and the spot of the trailing edge depends on the width of the pulse. For example, at the time instant t1 there are the rising edges of the pulses of both the colour signals A and B, at the time instant t2 there is the trailing edge of the pulse of the colour signal B, and the time instant t3 there is the trailing edge of the pulse of the colour signal B, and at the time instant t4, the control period ends. The pulse-width modulated control signals C1, C2, C3 are formed from signals A and B with the logic operations NOR, XOR, and correspondingly AND. Table 1 shows the logical operations truth table.

TABLE 1

| A | B | Active control signal | Logical operation |
|---|---|---|---|
| 1 | 1 | C1 | AND (A, B) = 1 |
| 1 | 0 | C2 | XOR (A, B) = 1 |
| 0 | 0 | C3 | NOR (A, B) = 1 |

In the time interval t1-t2, for example, both colour signals are in the logical state 1, whereby the logical operation AND(A,B)=1, XOR (A,B)=0 and NOR (A,B)=0, which provides the control signal states C1=ON, C2=OFF and C3=OFF.

Figure 5:
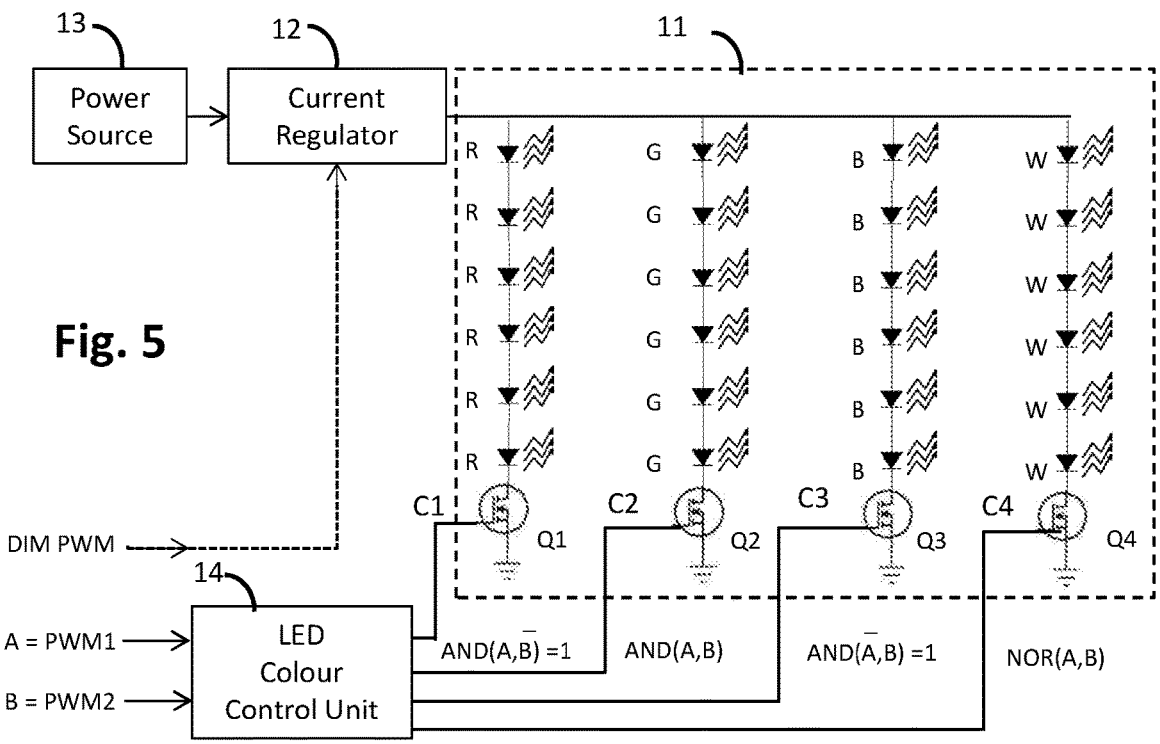
FIG. 5 shows a principled block and connection diagram of an RGBW-LED light source according to an exemplary embodiment.
Figure 6:
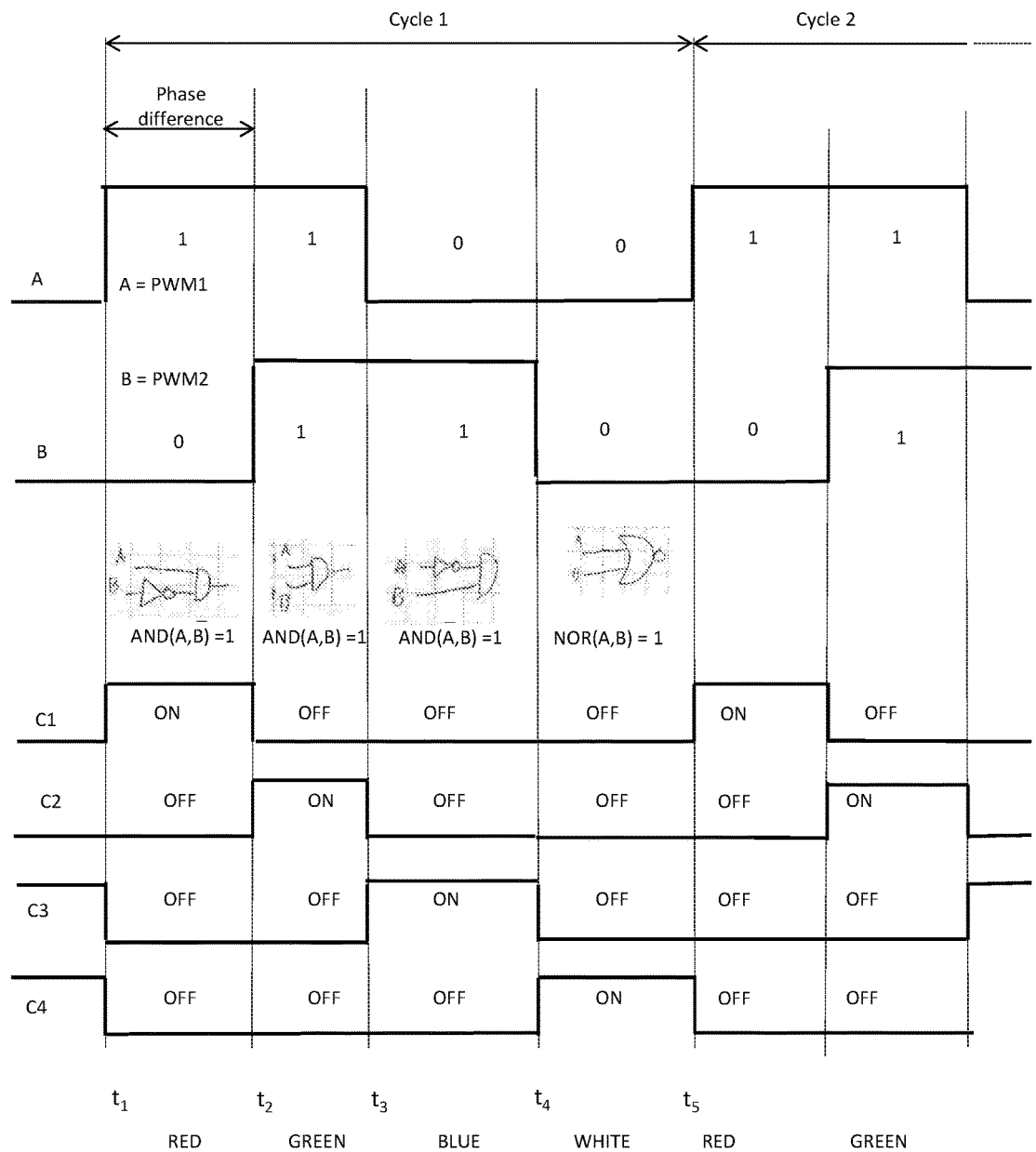
FIG. 6 is a signal flow diagram showing an example of forming the control signals of the light source in FIG. 5 from two pulse-width modulated colour signals.

In some embodiments of the invention, more than three LED strings are controlled. FIG. 5 shows an example of an RGBW-LED light source in principle. In FIGS. 1 and 5, the same reference symbols describe substantially similar structures and operations, unless otherwise stated. In the example of FIG. 5, the light source comprises four LED strings connected in parallel: a first LED string (R) emitting substantially red light, a second LED string (G) emitting substantially green light, a third LED string (B) emitting substantially blue light, and a fourth LED string (W) emitting substantially white light. The LED strings R, G, B, and W are connected to a common current source or current regulator 12, which they share as a function of time, on the current path of each LED strings R, G, B, and W, a semiconductor switch Q1, Q2, Q3 and correspondingly Q4 have been connected in series to close and open the current path as controlled by the pulse-width modulated colour control signals C1, C2, C3 and C4, in the same manner as in the examples above of the RGB-LED light source. In this case, however, the current source 12 is shared for four LED strings, so the control period requires four control pulses. In the timing table of FIG. 6, an example is shown on controlling the four LED strings of FIG. 5 during one control period. A fourth pulse has been added into the control period, in time interval t4-t5, to control the LED string W by the pulse-width modulated control signal C4. In other respects, the control may be implemented with same principles as in the RGB-LED embodiments. The same benefits may be reached with the RGBW-LED light source of FIG. 5 as in the RGB-LED embodiments described in the above.

Also the transfer of the information needed to form three or more pulse-width modulated control signals C1, C2, C3, and C4 in two pulse-width modulated colour control signals, such as the signals A and B (PWM1 and PWM2) in the example of FIG. 5. In some embodiments, the states (for example, 1 and 0) of the pulse-width modulated colour control signals A and B sequentially form four state combinations, each of which representing one pulse-width modulated control signals C1, C2, C3 and C4. The four state combinations are achieved with phase transfer between the rising edges of the control pulses of the colour control signals A and B. This is illustrated by means of an example in the top part of FIG. 6. At the time instant t1 there is the rising edge of the pulse of the colour control signal A, at the time instant t2 there is the rising edge of the pulse of the colour control signal B, at the time instant t3 there is the trailing edge of the pulse of the colour control signal A, at the time instant t4 there is the trailing edge of the pulse of the colour control signal B, and at the time instant t5 the control period ends. The pulse-width modulated control signals C1, C2, C3 and C4 may be formed from the signals A and B and their inverted values by logical operations AND and OR, for example. Table 2 shows the truth table of the exemplary logic.

TABLE 2

| A | B | Active control signal | Logical operation |
|---|---|---|---|
| 1 | 0 | C1 | AND (A,$\bar{B}$) = 1 |
| 1 | 0 | C2 | AND (A, B) = 1 |
| 0 | 1 | C3 | AND ($\bar{A}$,B) = 1 |
| 0 | 0 | C4 | NOR (A, B) = 1 |

The principles of the invention may also be applied to LED light sources in which several or all the LED strings are of the same colour, such as emitting white light. For example, there may be two LED strings that emit substantially white light, and one or more LED strings that emit an intensifier colour.

Figure 7:
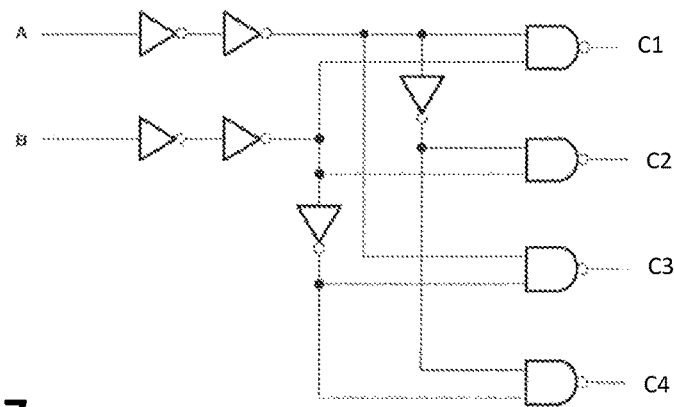
FIG. 7 is yet another example of the logic of forming the control signals of the light source from two pulse-width modulated colour signals.

FIG. 7 further still shows an example of a logic by which four colour control signals C1, C2, C3, and C4 may be formed from the signals A and B. Table 3 shows the truth table of the logic of FIG. 7.

TABLE 3

| A | B | Active control signal |
|---|---|---|
| 1 | 1 | C1 |
| 1 | 0 | C2 |
| 0 | 1 | C3 |
| 0 | 0 | C4 |

Figure 8:
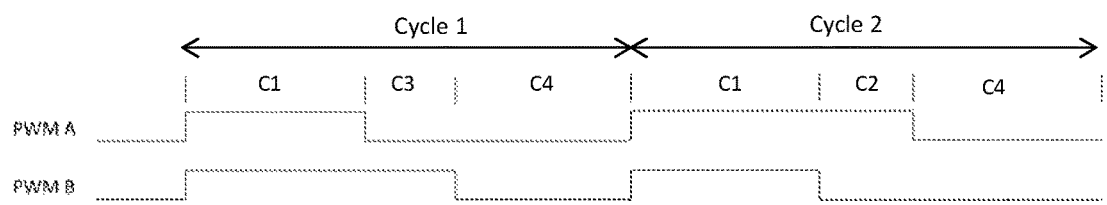
FIG. 8 is a signal flow diagram showing an example of forming the control signals of the light source by the logic of FIG. 7 from two pulse-width modulated colour signals that have simultaneous rising edges.

With the exemplary logic of FIG. 7, four control signals C1, C2, C3, and C4 may be formed from two pulse-width modulated colour control signals A and B, even if the rising edges of the signals A and B are simultaneous. In such a case, however, just three control signals may be used during one control period. This is illustrated by means of an example in the signal flow diagram of FIG. 8. The control signals C1 and C4 are available in each control period, but either of the control signals C2 and C3 may be selected for the control period. At the beginning of the period, the signals A and B are in the state 1, whereby the control signal C1 is selected. The selection is based on which of the signals A or B gets the shorter pulse width. If the pulse width of the signal A is less than the pulse width of the signal B, the control at about the middle of the control period gets the values A=0 and B=1, whereby the control signal C3 is selected. If the pulse width of the signal B is less than the pulse width of the signal A, the control gets the values A=1 and B=0, whereby the control signal C2 is selected.

This exemplary control makes possible a colour temperature adjustable LED card that has added to it two intensifier colours, such as red and blue. LEDs generating white colour would be controlled by the control signals C1 and C4 and the intensifier colours by the control signals C2 and C3. Of the intensifier colours, one at a time, only, would be used, as described in the above.

Figure 9:
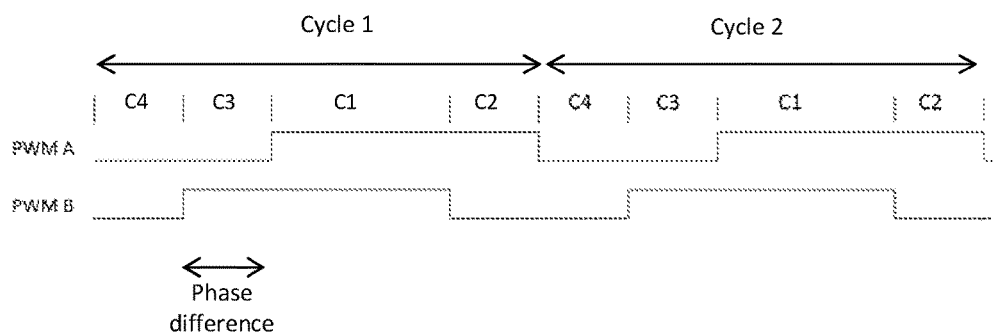
FIG. 9 is a signal flow diagram showing an example of forming the control signals of the light source by the logic of FIG. 7 from two pulse-width modulated colour signals that have their rising edges in a phase shift.

The exemplary logic of FIG. 7 may also be controlled by the colour control signals A and B that have phase shift between their rising edges. In such a case, all four control signals C1, C2, C3 and C4 are available in all the control periods, as illustrated in the signal flow diagram of FIG. 9.

A person skilled in the art will find it obvious that, as technology advances, the basic idea of the invention may be implemented in many different ways. The invention and its embodiments are thus not restricted to the above-described examples but may vary within the scope of the claims.

What is claimed is:

1. An LED light source comprising at least three series connections of a LED string and semiconductor switching device, which series connections are in parallel configuration and adapted to share a common current source as a function of time, and the LED light source further comprising a colour tone or colour temperature controller adapted to provide at least three pulse-width modulated control signals to control said at least three series connections of a semiconductor switch and a LED string sequentially active one at a time and to take current from said common current source for a time defined by the respective one of said pulse-width modulated control signals, wherein said colour tone or colour temperature controller is adapted to form said at least three pulse-width modulated colour control signals from two pulse-width modulated colour control signals.

2. An LED light source as claimed in claim 1, wherein the current of said common current source is adjustable for adjusting the light intensity.

3. An LED light source as claimed in claim 1, wherein said at least three LED strings (are adapted to emit respectively at least two different colours.

4. An LED light source as claimed in claim 1, wherein said at least three LED strings comprise LED strings emitting substantially two, three, or four different colours.

5. An LED light source as claimed in claim 1, wherein said light source is an RGB-LED light source, and wherein said at least three LED strings comprise a first LED string emitting substantially red light, a second LED string emitting substantially green light, and a third LED string emitting substantially blue light.

6. An LED light source as claimed in claim 1, wherein said light source is an RGBW-LED light source, and wherein said at least three LED strings comprise a first LED string emitting substantially red light, a second LED string emitting substantially green light, and a third LED string emitting substantially blue light, and a fourth LED string emitting substantially white light.

7. An LED light source as claimed in claim 1, wherein said at least three LED strings comprise a first LED string and a second LED string emitting substantially white light and at least one LED string emitting non-white light.

8. An LED light source as claimed in claim 1, comprising a first LED group having said at least three series connections of a LED string and a semiconductor switch device in parallel configuration, and at least one parallel LED group which has corresponding at least three series connections of a LED string and a semiconductor switch device parallel configuration, said at least one parallel LED group each having its own common time-shared current source, and wherein said at least three pulse-width modulated control signals of the colour tone or colour temperature controller are adapted to control all the LED groups simultaneously in parallel whereby the corresponding series connection of a LED string and a semiconductor switch device in all the LED groups is simultaneously controlled to be active and to take current from said common current source for the time defined by the corresponding pulse-width modulated control signal.

9. A control method, comprising
inputting to a LED light source two pulse-width modulated colour control signals to control the colour tone or colour temperature of the LED light source; the LED light source comprising at least three series connections of a LED string and semiconductor switching device, which series connections are in parallel configuration and adapted to share a common current source as a function of time, forming, in the LED light source at least three pulse-width modulated colour control signals from said two pulse-width modulated colour control signals, applying said at least three pulse-width modulated control signals to control said at least three series connections of a semiconductor switch and a LED string sequentially active one at a time and to take current from said common current source for a time defined by the respective one of said pulse-width modulated control signals.

10. A method as claimed in claim 9, wherein the states of said two pulse-width modulated colour control signals sequentially form at least three state combinations each of which represents one of said at least three pulse-width modulated colour control signals.

11. A method as claimed in claim 9, wherein the rising edges of said two pulse-width modulated colour control signals are substantially simultaneous, and wherein said at least three pulse-width modulated colour control signals are formed from said two pulse-width modulated colour control signals by logical operations, preferably logical NOR, XOR, and AND operations.

12. A method as claimed in claim 9, wherein the rising edges of said two pulse-width modulated colour control signals are substantially coincident, and wherein four pulse-width modulated colour control signals are formed from said two control signals by logical operations, two of said four pulse-width modulated colour control signals being available in each control cycle and the other two of said four pulse-width modulated colour control signals being selectively selectable.

13. A method as claimed in claim 9, where the rising edges of said two pulse-width modulated colour control signals have a phase difference, and four pulse-width modulated colour control signals are formed wherein from said two control signals by logical operations.

14. A lighting fixture comprising an LED light source, said LED light source further comprising at least three series connections of a LED string and semiconductor switching device, which series connections are in parallel configuration and adapted to share a common current source as a function of time, and the LED light source further comprising a colour tone or colour temperature controller adapted to provide at least three pulse-width modulated control signals to control said at least three series connections of a semiconductor switch and a LED string sequentially active one at a time and to take current from said common current source for a time defined by the respective one of said pulse-width modulated control signals, wherein said colour tone or colour temperature controller is adapted to form said at least three pulse-width modulated colour control signals from two pulse-width modulated colour control signals.

15. A lighting system comprising
a plurality of LED light sources,
control unit configured to output two pulse-width modulated colour control signals controlling a colour tone or colour temperature of said plurality of LED light sources,
at least one of said LED light sources comprising at least three series connections of a LED string and a semiconductor switching device, which series connections are in parallel configuration and adapted to share a common current source as a function of time,
said at least one of said LED light sources further comprising a colour tone or colour temperature controller adapted to provide at least three pulse-width modulated colour control signals from said two pulse-width modulated colour control signals to control said at least three series connections of a semiconductor switch and a LED string sequentially active one at a time and to take current from said common current source for a time defined by the respective one of said pulse-width modulated control signals.

\* \* \* \* \*